(12) United States Patent
Rospsha et al.

(10) Patent No.: US 8,606,110 B2
(45) Date of Patent: Dec. 10, 2013

(54) OPTICAL DISTRIBUTED ANTENNA SYSTEM

(75) Inventors: Nimrod Rospsha, Rishon-LeZion (IL); Yossef Ben Ezra, Rehovot (IL)

(73) Assignee: Optiway Ltd., Rosh Ha'ayin (IL)

( * ) Notice: Subject to any disclaimer, the term of this patent is extended or adjusted under 35 U.S.C. 154(b) by 153 days.

(21) Appl. No.: 13/345,723

(22) Filed: Jan. 8, 2012

(65) Prior Publication Data

US 2013/0177317 A1    Jul. 11, 2013

(51) Int. Cl.
*H04B 10/00*    (2013.01)

(52) U.S. Cl.
USPC .......................................... 398/116; 398/115

(58) Field of Classification Search
USPC ................................................ 398/115–117
See application file for complete search history.

(56) References Cited

U.S. PATENT DOCUMENTS

| | | | |
|---|---|---|---|
| 5,572,612 A * | 11/1996 | Delavaux et al. | 385/24 |
| 5,838,474 A | 11/1998 | Stilling | |
| 6,937,878 B2 * | 8/2005 | Kim et al. | 455/561 |
| 7,085,497 B2 * | 8/2006 | Tiemann et al. | 398/107 |
| 7,127,176 B2 * | 10/2006 | Sasaki | 398/115 |
| 7,269,311 B2 * | 9/2007 | Kim et al. | 385/24 |
| 7,280,267 B2 * | 10/2007 | Van Tuyl | 359/318 |
| 7,359,637 B2 * | 4/2008 | Kim et al. | 398/72 |
| 7,386,235 B2 * | 6/2008 | Jennen et al. | 398/72 |
| 7,440,699 B1 * | 10/2008 | Stewart et al. | 398/116 |
| 7,539,419 B2 * | 5/2009 | Sasai et al. | 398/115 |
| 7,616,892 B2 * | 11/2009 | Suzuki et al. | 398/72 |
| 7,653,313 B2 * | 1/2010 | Lee et al. | 398/115 |
| 7,660,531 B2 * | 2/2010 | Lee et al. | 398/115 |
| 7,738,167 B2 * | 6/2010 | Kim et al. | 359/344 |
| 7,903,979 B2 * | 3/2011 | Lee et al. | 398/168 |
| 7,965,939 B2 * | 6/2011 | Gadkari et al. | 398/67 |
| 8,023,824 B2 * | 9/2011 | Yu et al. | 398/72 |
| 8,135,288 B2 * | 3/2012 | Franklin | 398/196 |
| 8,270,833 B2 * | 9/2012 | Lin et al. | 398/72 |
| 8,364,039 B2 * | 1/2013 | Yeh et al. | 398/72 |
| 8,422,883 B2 * | 4/2013 | Yeh et al. | 398/115 |

(Continued)

FOREIGN PATENT DOCUMENTS

EP     2367306     9/2011

OTHER PUBLICATIONS

B. Ftaich-Frigui et al, OFDM-WiMAX Modulation of a Reflective Amplified Modulator in Radio-Over-Fiber Context, IEEE Photonics Technology Letters, Aug. 15, 2011, vol. 23, No. 16.

(Continued)

*Primary Examiner* — Agustin Bello
(74) *Attorney, Agent, or Firm* — Nathan & Associates Patent Agents Ltd.; Menachem Nathan

(57) ABSTRACT

Optical distributed antenna systems comprising a head-end unit adapted to transmit downlink a modulated optical signal with wavelength $\lambda_o$ and N un-modulated optical signals with wavelength $\lambda_N$ and N remote units (RU) and including at least one circulator. In some embodiments, an HE unit includes an arrangement of a single circulator coupled to a single detector, the arrangement preventing beating. In some embodiments, a RU includes a reflective electro-absorption transceiver (REAT) which includes a single optical interface and a single RF port. The REAT detects the optical signal with $\lambda_o$ and converts it into a RF signal, and reflects an un-modulated optical signal with wavelength $\lambda_N$ to provide a modulated uplink optical signal. In some embodiments, a RU is configured as an optical antenna unit. In some embodiments, a plurality of RUs is combined with passive optical distribution units to provide hierarchical DAS architectures.

20 Claims, 15 Drawing Sheets

(56) References Cited

U.S. PATENT DOCUMENTS

| | | | |
|---|---|---|---|
| 2002/0012495 A1* | 1/2002 | Sasai et al. ............... 385/24 |
| 2003/0016418 A1* | 1/2003 | Westbrook et al. ........ 359/145 |
| 2003/0118280 A1* | 6/2003 | Miyazaki et al. .......... 385/24 |
| 2003/0161637 A1* | 8/2003 | Yamamoto et al. ........ 398/167.5 |
| 2004/0001719 A1* | 1/2004 | Sasaki ....................... 398/115 |
| 2005/0141072 A1 | 6/2005 | Lam et al. |
| 2005/0254820 A1* | 11/2005 | Zhou et al. ................ 398/83 |
| 2006/0062579 A1* | 3/2006 | Kim et al. ................. 398/115 |
| 2006/0083520 A1* | 4/2006 | Healey et al. ............. 398/200 |
| 2006/0093359 A1* | 5/2006 | Lee et al. .................. 398/70 |
| 2006/0104643 A1* | 5/2006 | Lee et al. .................. 398/115 |
| 2006/0210271 A1* | 9/2006 | Mori .......................... 398/71 |
| 2006/0222369 A1* | 10/2006 | Kim et al. ................. 398/115 |
| 2007/0058978 A1* | 3/2007 | Lee et al. .................. 398/115 |
| 2007/0133995 A1* | 6/2007 | Lee et al. .................. 398/115 |
| 2008/0063397 A1* | 3/2008 | Hu et al. ................... 398/43 |
| 2008/0101798 A1* | 5/2008 | Healey et al. ............. 398/115 |
| 2008/0131125 A1* | 6/2008 | Byoung Whi et al. .... 398/72 |
| 2010/0028012 A1* | 2/2010 | Ng ............................. 398/116 |
| 2010/0046946 A1* | 2/2010 | Cao et al. .................. 398/72 |
| 2010/0142955 A1* | 6/2010 | Yu et al. .................... 398/72 |
| 2010/0215308 A1 | 8/2010 | Moodie |
| 2010/0215368 A1* | 8/2010 | Qian et al. ................. 398/67 |
| 2010/0221015 A1* | 9/2010 | Williams ................... 398/115 |
| 2010/0239253 A1* | 9/2010 | Lin et al. ................... 398/63 |
| 2010/0247105 A1* | 9/2010 | Yu .............................. 398/116 |
| 2010/0266283 A1* | 10/2010 | Beckett ...................... 398/68 |
| 2011/0026923 A1* | 2/2011 | Kim et al. ................. 398/79 |
| 2011/0116808 A1 | 5/2011 | Talli et al. |
| 2011/0135308 A1* | 6/2011 | Tarlazzi et al. ............ 398/79 |
| 2011/0188859 A1* | 8/2011 | Wen et al. ................. 398/79 |
| 2011/0211839 A1* | 9/2011 | Lee et al. .................. 398/79 |
| 2012/0106973 A1* | 5/2012 | Yu .............................. 398/116 |
| 2012/0134666 A1* | 5/2012 | Casterline et al. ........ 398/22 |
| 2013/0170834 A1* | 7/2013 | Cho et al. .................. 398/58 |
| 2013/0177317 A1* | 7/2013 | Rospsha et al. ........... 398/93 |

OTHER PUBLICATIONS

Jeha Kim et al, 60-GHz System-on-Packaging Transmitter for Radio-Over-Fiber Applications, Journal of Lightwave Technology, Aug. 1, 2008, vol. 26, No. 15.

Chul Soo Park et al, A photonic up-converter for a WDM radio-over-fiber system using cross-absorption modulation in an EAM, IEEE Photonics Technology Letters, Sep. 2005, vol. 17, No. 9.

Y B Cheng et al, High-power electroabsorption modulator for radio over fiber system, Journal of Physics D: Applied Physics, 2007, 40, pp. 4120-4122.

* cited by examiner

FIG. 1 (Known art)

FIG. 2 (Known art)

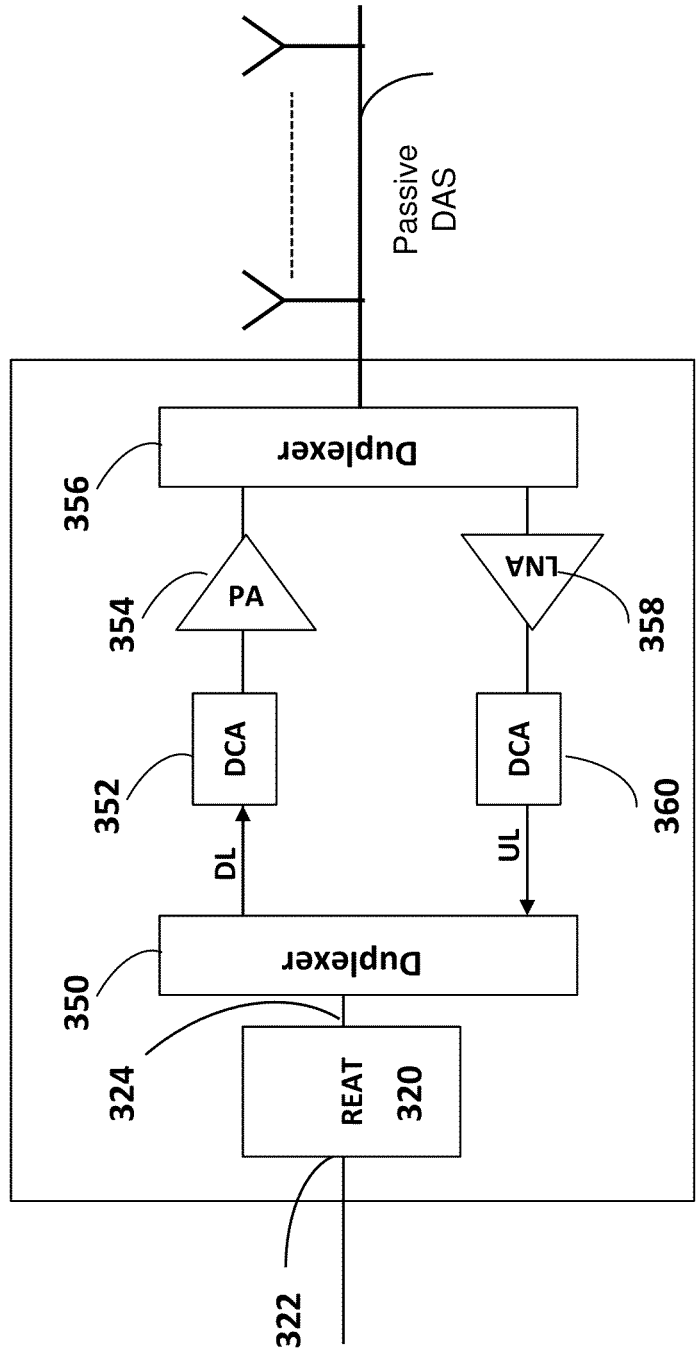

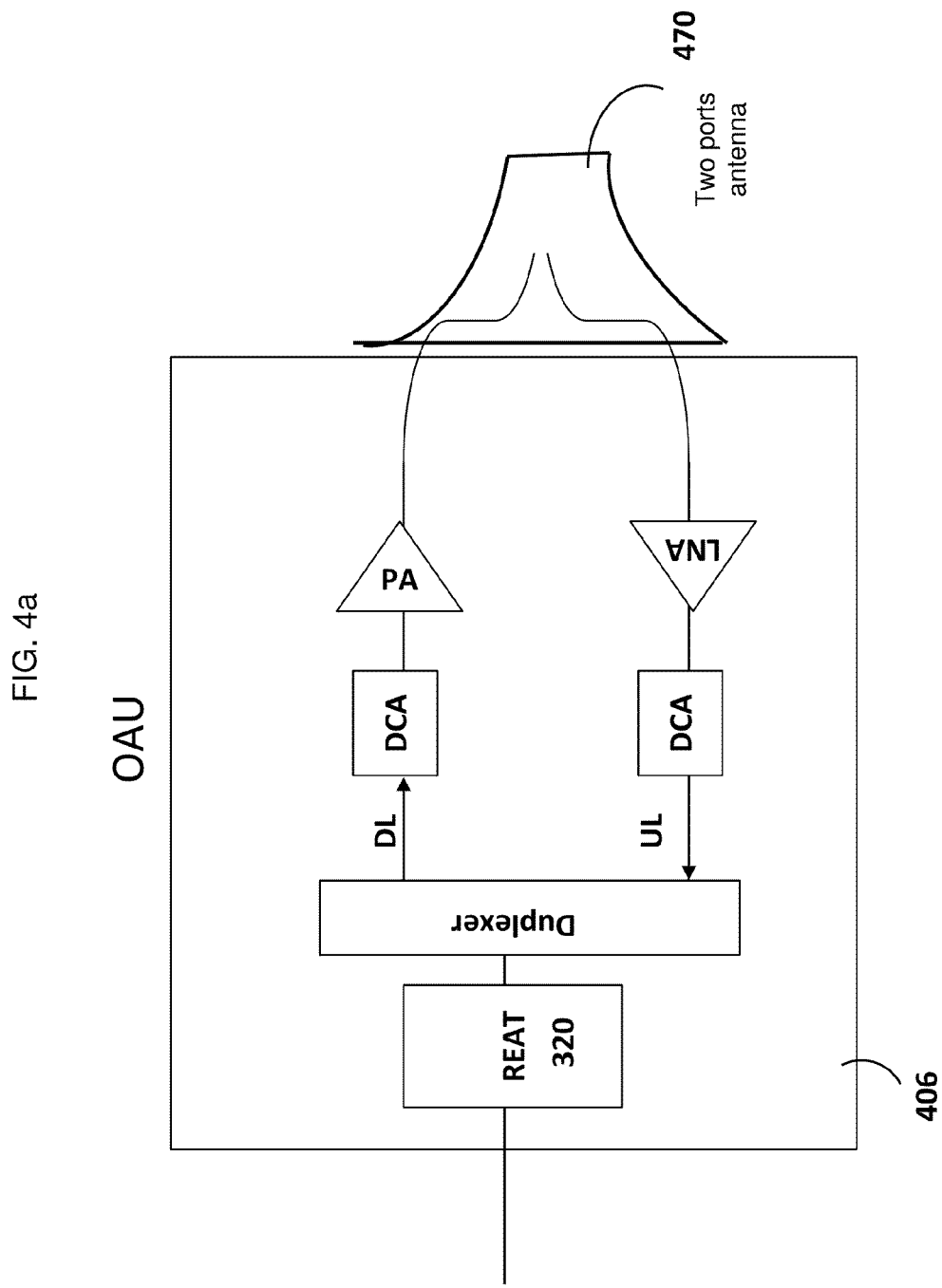

OPTICAL DISTRIBUTED ANTENNA SYSTEM

FIELD

Embodiments of various systems disclosed herein relate in general to combined wireless/optical communication systems and more particularly to optical Distributed Antenna Systems (DAS).

BACKGROUND

Optical distributed antenna systems based on the combined use of radio frequency (RF) and optical signals are known, and used for example in radio-over-fiber systems. FIG. 1 shows schematically a known optical DAS 100 which includes a head-end (HE) unit 102 connected over a plurality N of point-to-point (P2P) optical fibers 104-1 . . . 104-N to N (N≥1) remote units (RUs) 106-1 . . . 106-N. Each RU may be connected to a passive DAS which includes a coax cable 112 and one or more antennas 114. Exemplarily in DAS 100, N=8. HE unit 102 includes one optical transmitter (exemplarily a diode laser) TX-0, N=8 receivers (typically photodiodes) RX-1 . . . RX-8 and N optical interfaces (ports) 108-1 . . . 108-8. Each remote unit includes RX and TX functionalities, provided in some cases by an electro-optical absorption modulator (EAM). Uplink (UL), the EAM modulates a RF signal received via the antenna into an optical signal which is transmitted to the head-end unit. Downlink (DL), the EAM converts an optical signal into a RF signal (i.e. acts as an optical detector). The UL and DL optical signals are transmitted over separate optical fibers, i.e. each EAM has two separate optical interfaces in addition to one RF port. In some applications, the EAM may have a multi-quantum well (MQW) structure, with its operation based on the quantum confined Stark effect (QCSE). A major disadvantage of such an EAM acting as an optical detector is its low efficiency, because the DL optical signal makes just one "pass" before being absorbed by the EAM structure.

The remote unit TX functionality may also be provided by a reflective optical transmitter (ROT), which joins or integrates an EAM having a reflective facet with a semiconductor optical amplifier (SOA). The combination is sometimes called SOA-EAM or REAM. However, such transmitters need a voltage input to bias the SOA in addition to a modulating electrical signal applied to the EAM. In other words, a SOA-EAM device has one optical interface, one RF port and one voltage source coupled thereto. Therefore, in known art, components in a RU which act as both receivers (detectors) of DL signals and transmitters of UL signals include always three ports or inputs/outputs.

Returning now to FIG. 1 and exemplarily, four wireless RF services (Bands 1, 2, 3 and 4) are combined and multiplexed in HE unit 102. The combined RF signal is converted into an optical signal with wavelength $\lambda_0$ (hereinafter, "wavelength $\lambda$" is referring to simply as "$\lambda$"). The optical signal is split to optical interfaces 108-1 . . . 108-8 for DL transmission over a respective optical fiber to each remote unit. Each RU performs optical-to-RF conversion of the DL signal and outputs a RF signal to one or more antennas. Uplink, each RU receives a RF signal from an antenna and converts it into a $\lambda_1$ optical signal which is transmitted to the HE unit. In known optical DAS, the source of the UL $\lambda_1$ optical signal is either in the RU (i.e. the RU includes an optical transmitter) or remote from the RU, with $\lambda_1$ input to the EAM and modulated thereby.

Communication networks are usually built in a hierarchical topology. Such topology is more scalable and flexible, enabling to design the network more efficiently. Consequently, deployment of hierarchical DAS topologies would be beneficial to an operator. However, the architecture of DAS 100 is "flat" in the sense that is does not allow an operator to design and deploy more efficient hierarchical DAS topologies. This arises from the use in DAS 100 of a P2P fiber between the HE and remote units, without any intermediate aggregation unit. The "flatness" problem may be solved by a hierarchical architecture shown in FIG. 2, in which an optical DAS 200 includes a C/DWDM (coarse/dense wavelength division multiplexer) or, equivalently, N WDM components positioned between a HE unit 202 and N remote units 206-1 . . . 206-8. Each RU is deployed with a different wavelength. The HE unit uses a $\lambda_0$ for DL transmission, while each RU uses a different $\lambda_N$ for UL transmission. Exemplarily, $\lambda_0$ may be in the 1310-1330 nm wavelength range, while $\lambda_N$ may be in the 1530-1560 nm wavelength range. Because the order of the different $\lambda_N$ must be maintained in a C/DWDM component, the operator needs to administer these wavelengths. This is a major disadvantage. In addition, because each RU uses a different UL wavelength, the operator needs to maintain a stock of different RU transmitters.

Therefore, there is a need for and it would be advantageous to have simplified and efficient optical DAS architectures which overcome concurrently the "flatness" problem, the need to use a C/DWDM unit or multiple WDM units between head-end and remote units, and/or the need to maintain a stock of different RU transmitters. Such simplified and efficient optical DAS architectures will thereby reduce maintenance costs and increase product reliability and mean time between failures (MTBF). They will also reduce the need for different remote units and the need for special wavelength design.

SUMMARY

In various embodiments, there are provided optical distributed antenna systems (DAS) which include a HE unit which transmits downlink a $\lambda_0$ optical signal and optical carriers or continuous waves (CWs) with wavelength $\lambda_N$ (N≥1), and one or more remote units which detect the $\lambda_0$ optical signal and convert it into a RF signal and which reflect a $\lambda_N$ CW and modulate it into a $\lambda_N$ optical signal for uplink transmission to the HE unit. The detection, modulation and reflection are enabled by a reflective electro-absorption transceiver (REAT) positioned in each remote unit. In contrast with known SOA-EAM or REAM components, a REAT disclosed herein has a single optical interface and a single RF port and requires no separate voltage source. The HE unit includes transmitters for each $\lambda_N$ in addition to the transmitter for $\lambda_0$. The HE unit also includes circulators which manage the UL and DL traffic. In some embodiments, a RU is coupled to a passive DAS. In some embodiments, a RU is coupled to a single antenna, forming an optical antenna unit (OAU). In some embodiment, the HE unit and the RUs are modified to handle digital traffic. In some embodiments, an optical DAS disclosed herein includes a passive optical distribution unit (PODU) coupled through an optical fiber to a RU and through a "composite" (i.e. optical plus electrical) cable to an OAU. In some embodiments, the PODUs are cascaded to provide increasingly hierarchical DAS architectures.

In an embodiment there is provided an optical DAS comprising a HE unit used to transmit downlink a modulated $\lambda_0$ optical signal and a plurality N of continuous waves, each continuous wave having a different wavelength $\lambda_N$, and a plurality of remote units wherein each remote unit includes a REAT which has a single optical interface and a single RF port, the REAT used to detect and convert the $\lambda_O$ optical signal into a RF signal and to reflect and modulate one continuous wave with wavelength $\lambda_N$ for uplink transmission to the HE unit.

In an embodiment there is provided an optical DAS comprising a HE unit used to transmit downlink a modulated $\lambda_O$ optical signal and a plurality N of continuous waves with respectively different wavelengths $\lambda_N$, the HE unit including an arrangement of a single detector and a circulator for a bunch of uplink signals with wavelength $\lambda_1$ to $\lambda_N$, wherein the arrangement prevents beating per bunch, and a plurality of remote units, each remote unit including a REAT used to detect and convert the $\lambda_O$ optical signal into a RF signal and to reflect and modulate one CW with wavelength $\lambda_N$ for uplink transmission to the HE unit.

In an embodiment, an optical DAS further includes a passive optical antenna unit (PODU) interposed between at least one RU and the HE unit, the PODU configured to enable a hierarchical DAS architecture.

In an embodiment there is provided a method for communications in an optical DAS comprising the steps of: at a HE unit, transmitting downlink to a remote unit a modulated optical signal with wavelength $\lambda_O$ and a continuous wave with wavelength $\lambda_N$; at the RU, using a REAT with a single optical interface and a single RF port to convert the modulated optical signal with wavelength $\lambda_O$ into a downlink RF signal and to reflect and modulate the CW with wavelength $\lambda_N$ to obtain a reflected modulated optical signal with wavelength $\lambda_N$; and transmitting the reflected optical signal with wavelength $\lambda_N$ uplink to the HE unit.

BRIEF DESCRIPTION OF THE DRAWINGS

The invention is herein described, by way of example only, with reference to the accompanying drawings, wherein:

FIG. 3c shows schematically an embodiment of a remote unit disclosed herein;

FIG. 4a shows details of an optical antenna unit in the optical DAS embodiment of FIG. 4;

DETAILED DESCRIPTION

Figure 1:
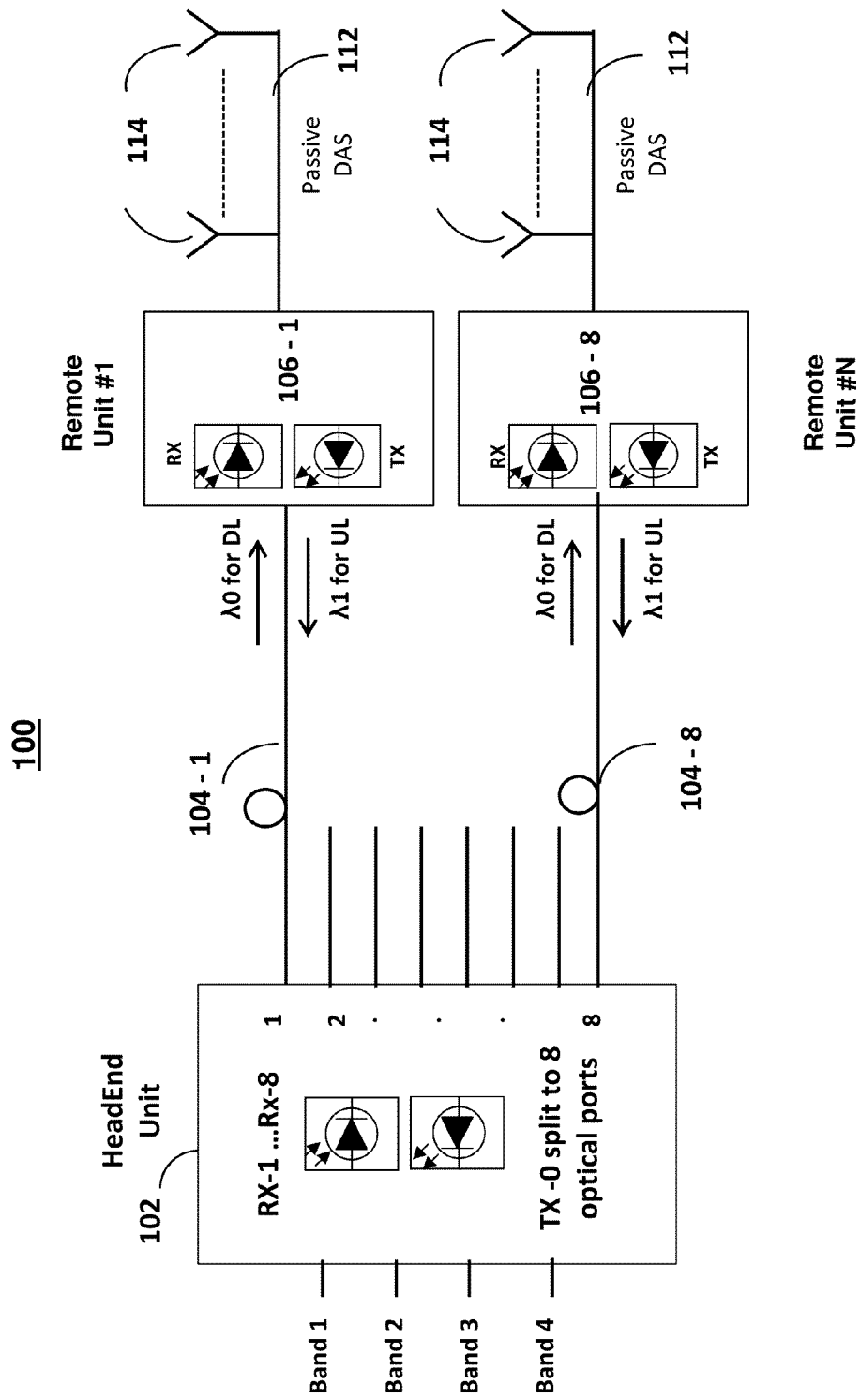
FIG. 1 shows schematically a known "flat" conventional optical DAS.
Figure 2:
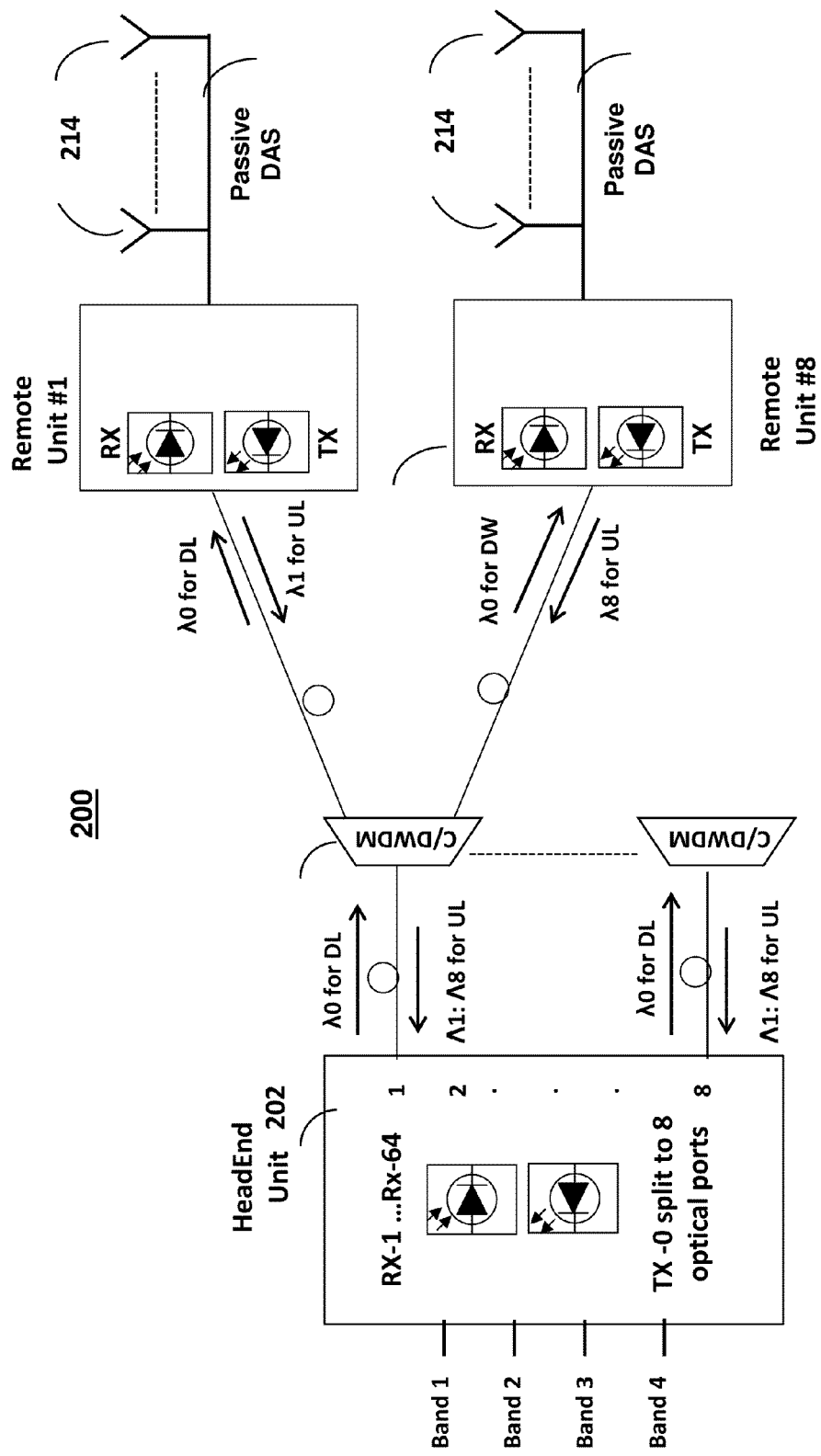
FIG. 2 shows schematically a known "hierarchical" optical DAS which includes a C/DWDM.
Figure 3:
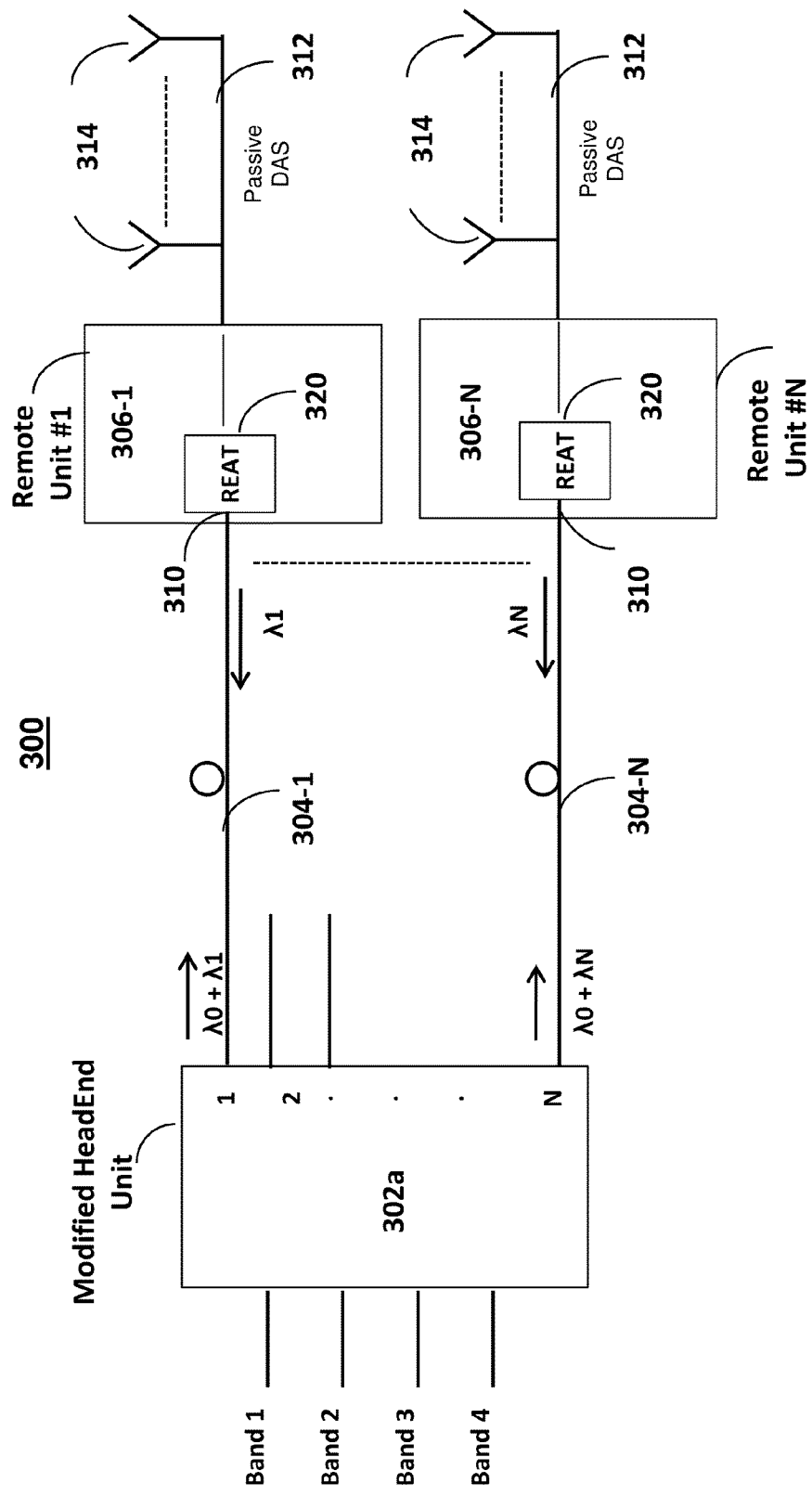
FIG. 3 shows schematically an embodiment of an optical DAS disclosed herein.

Referring now to the figures, FIG. 3 shows an embodiment of an optical DAS disclosed herein, marked 300. Embodiment 300 includes a HE unit 302 (described in more detail below) connected over N P2P optical fibers 304-1 . . . 304-N to N RUs 306-1 . . . 306-N. The fibers may be single mode or multimode. Each RU includes a REAT 320 which has a single optical interface 310 and a single RF port 324 (FIG. 3c). Advantageously, the REAT provides much higher optical detection efficiency than known EAM receivers, because the DL optical signal is reflected and performs a double pass before it is absorbed in the REAT structure. An exemplary component which may be used as a REAT in various embodiments disclosed herein is component EAM-R-10-C-7S-FCA 10 Ghz, manufactured and sold by CIP Technologies, Phoenix House, B55 Adastral Park, Martlesham Heath, Ipswich IP5 3RE, UK. Each fiber 304 carries DL and US traffic with two wavelengths. HE unit 302 includes a transmitter (e.g. diode laser) TX-0 (see FIGS. 4a and 4b) for the DL transmission of the signal and N optical interfaces 308-1 . . . 308-N. HE unit 302 further includes N transmitters (TX-1 . . . TX-N in FIGS. 4a, 4b), each assigned with a different for downlink CW transmission, and N circulators 330-1 . . . 330-N (see FIG. 3a).

Exemplarily in FIG. 3, four wireless RF services (Bands 1, 2, 3 and 4) are combined and multiplexed by the head-end unit. The combined RF services signal is then split to N optical interfaces and modulated for DL transmission over a respective fiber to each RU. At the RU, the optical signal is converted into an RF signal by the REAT and sent to antennas. Operations in the uplink are reversed, with uplink RF-to-optical conversion and optical transmission performed by the REAT. More details are given below.

Figure 3A:
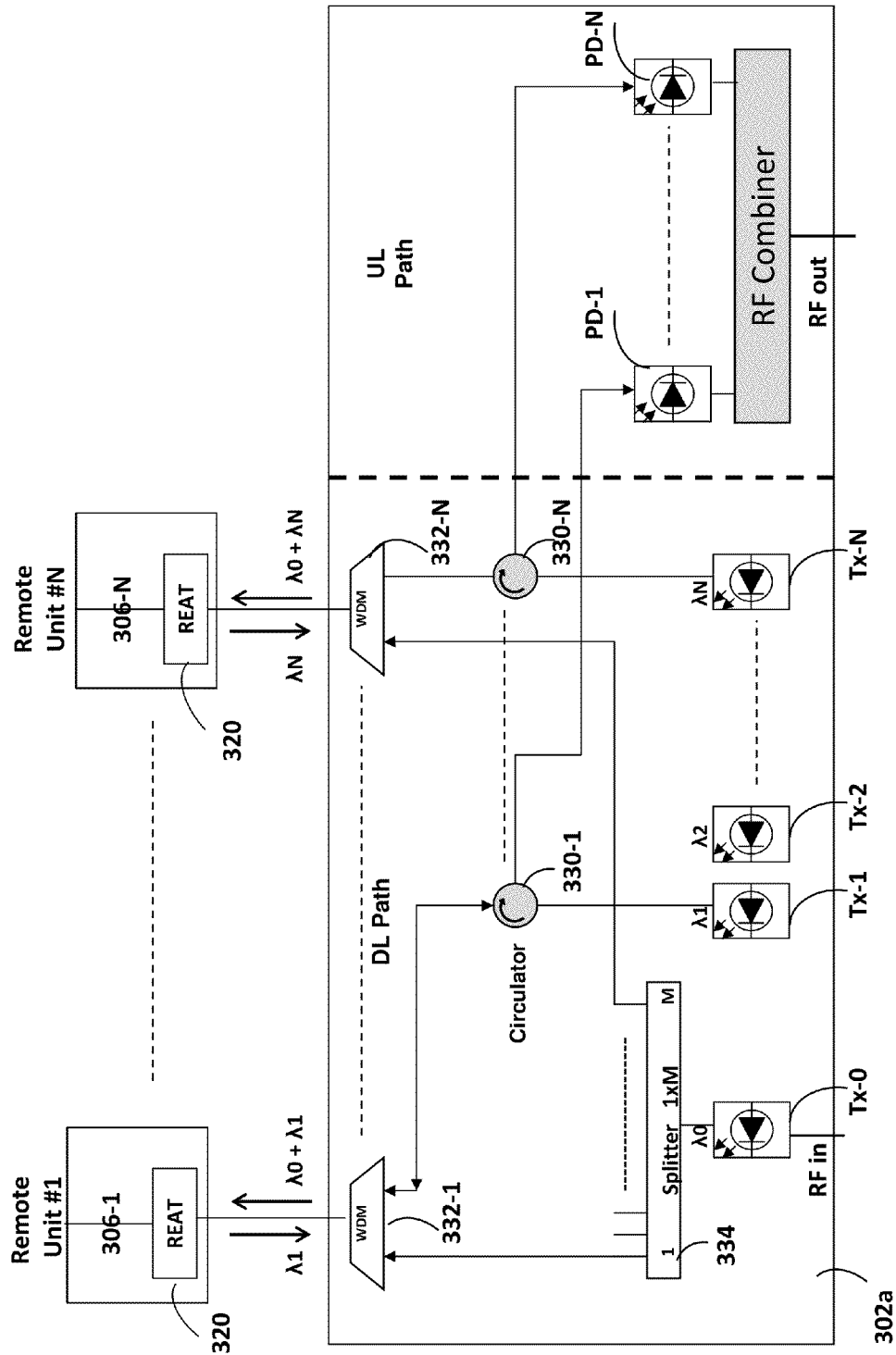
FIG. 3a shows details of one embodiment of a head-end unit disclosed herein.

FIG. 3a shows details of one embodiment of a HE unit disclosed herein, marked 302a. HE unit 302a includes (in addition to the transmitters and circulators mentioned for HE unit 302 above) N WDMs 332-1 . . . 332-N, a 1×N splitter 334, a RF combiner 336 and N detectors (e.g. photodiodes) PD-1 . . . PD-N, interconnected as shown. Each WDM is connected through an optical interface to a respective RU which includes a REAT. HE unit 302a is thus adapted to transmit DL a $\lambda_O$ optical signal and N CWs with $\lambda_1 \ldots \lambda_N$. Optical circulators 330 serve to pass DL a CW to a common port and to pass UL a modulated optical signal from the common port to one photodiode.

The following illustrates an exemplary method of use of DAS 300 with HE unit 302a, applied to one service (e.g. Band 1 also referred to as "Service A"). In the DL path, a signal of service A is received by the HE unit from a wireless base station or from any other RF signal source at a port RF in. The signal is combined with those of other wireless services and is converted for optical transmission using TX-0. The downlink $\lambda_O$ optical signal is distributed to all WDM 332 components. Each WDM receives, in addition to the $\lambda_O$ signal, one CW with $\lambda_N$ output from a respective TX-N. Each WDM outputs towards a respective RU the $\lambda_O$ signal and the CW with $\lambda_N$ (exemplarily $\lambda_1$). CW $\lambda_1$ is reflected by the REAT in the RU and modulated for UL transmission. The modulated $\lambda_1$ signal is transmitted through the respective fiber to the HE unit, from which it is routed through a respective circulator (e.g. 330-1) to a respective detector (e.g. PD-1) where it is converted into a RF signal. The RF signals with different wavelengths are then combined in RF combiner 336 and output through an output port RF out.

The physical action of the REAT is based on QCSE. The REAT includes a semiconductor MQW structure (the EAM) bound on one side by a reflecting element. According to the QCSE, the band-gap between the conduction and valence bands in a semiconductor QW can be modulated using an external electric field. An RF signal serves as a time dependent electric field. When the RF signal (field) is applied to the EAM, the band-gap varies in time (i.e. the RF field "controls" the band-gap). Photons entering the EAM may have energies smaller or larger than the band-gap. The former (smaller energy than band-gap) pass through the EAM undisturbed, while the latter are absorbed. Since the external RF field controls the band-gap, it controls the absorption rate of photons with energies close to the band-gap. When a CW of appropriate wavelength arrives at the REAT, the RF field applied to the REAT can modulate it. If the difference between a shorter wavelength $\lambda_0$ and longer wavelengths $\lambda_N$ is large enough, the modulation of the $\lambda_N$ by the RF field will not affect the absorption of the $\lambda_0$. Moreover, this absorption is enhanced by the double path taken by $\lambda_0$ (which is reflected by the reflective facet of the REAT). In contrast with known SOA-EAM or REAM components, a REAT disclosed herein functions as both optical receiver (detector) and transmitter and does not require a separate voltage source.

Figure 3B:
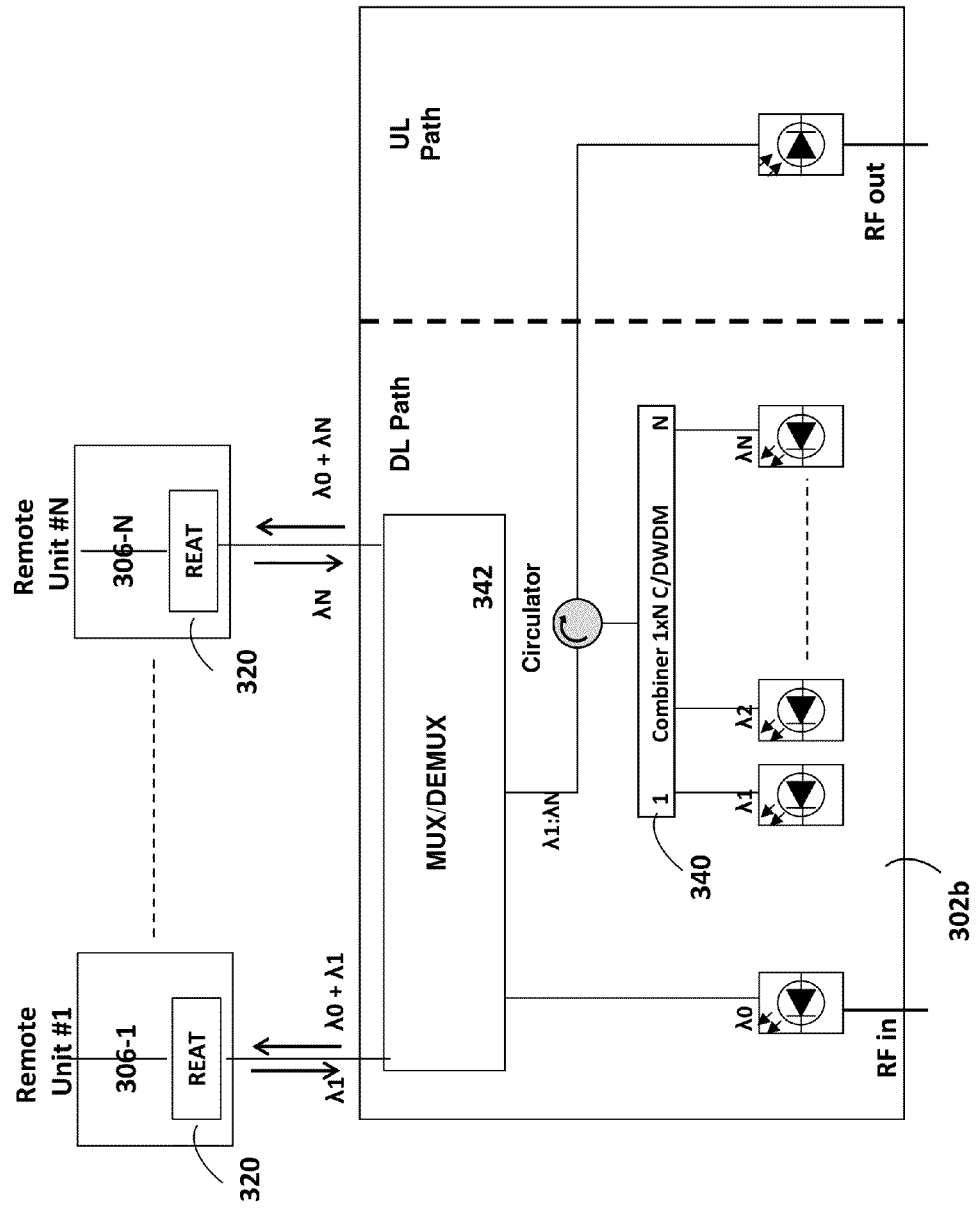
FIG. 3b shows details of an embodiment of another head-end unit disclosed herein.

FIG. 3b shows details of an embodiment of another HE unit disclosed herein, marked 302b. In the DL path, unlike HE unit 302a, HE unit 302b includes a single 1×N C/DWDM combiner 340 which replaces WDMs 332-1 . . . 332-N. This reduces the need for N circulators, leaving only one circulator 330. However, this further requires an optical multiplexer/demultiplexer (MUX/DEMUX) 342, In further contrast with HE unit 302a, HE unit 302b now includes a single circulator and a single detector PD-1 in the UL path, and the RF combiner (336 in HE unit 302a) is removed.

In use, exemplarily again for service A, a RF signal of this service is received by HE unit 302b at a port RF in. In the DL path, the signal is combined with those of other wireless services and is converted for optical transmission using TX-0. TX-0 transmits a $\lambda_0$ signal to MUX/DEMUX 342, which also receives through circulator 330 a CW with $\lambda_N$ (exemplarily $\lambda_1$). MUX/DEMUX 342 outputs towards each RU the $\lambda_0$ signal and the CW $\lambda_N$. The latter is reflected and modulated by the REAT for UL transmission as described above. The UL $\lambda_N$ signal enters MUX/DEMUX 342 which routes it through the circulator to single detector PD-1, where it is converted into a RF signal output through port RF out.

In general, uplink signals created by the different REATs will have up to N different wavelengths $\lambda_N$, which are spread in MUX/DEMUX 342, are routed through the single circulator and are detected by single detector PD-1. Advantageously, the use of different wavelengths $\lambda_N$ allows implementation of an HE unit with a single detector, yet prevents a "beating" phenomenon.

FIG. 3c shows schematically details of an embodiment of a RU disclosed herein, marked 306a. RU 306a includes REAT 320, a first duplexer 350, a first digital control attenuator (DCA) 352, a power amplifier (PA) 354, a second duplexer 356, a low noise amplifier (LNA) 358 and a second DCA 360, interconnected as shown. The function of each element (except that of the REAT, which is described above) is known to one of ordinary skill in the art.

Figure 4:
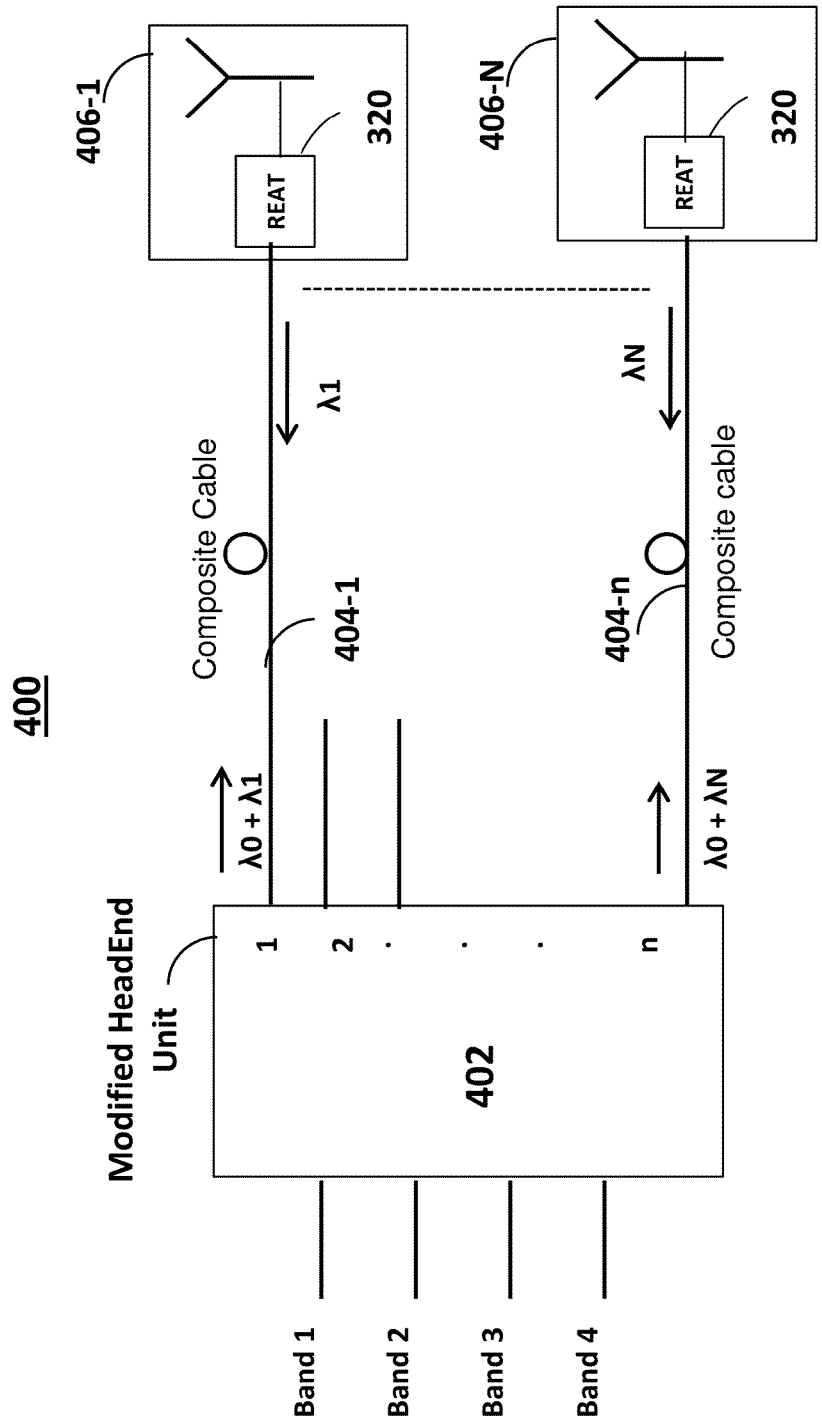
FIG. 4 shows schematically another embodiment of an optical DAS disclosed herein.

FIG. 4 shows another embodiment of an optical DAS disclosed herein marked 400. DAS 400 comprises a HE unit 402 connected through respective composite (optical+electrical) cables 404 to N RUs of a different type, referred to herein as "optical antenna units" (OAUs) 406. Details of an OAU are shown in FIG. 4a. An OAU differs from a regular RU (e.g. as in FIG. 3c) in that it is coupled to a single antenna 470 without the need for a coax cable between the PA and LNA and the antenna, and in that the duplexer 356 is removed and the UL and DL RF signals are combined through the antenna using two-port antenna isolation.

Figure 5:
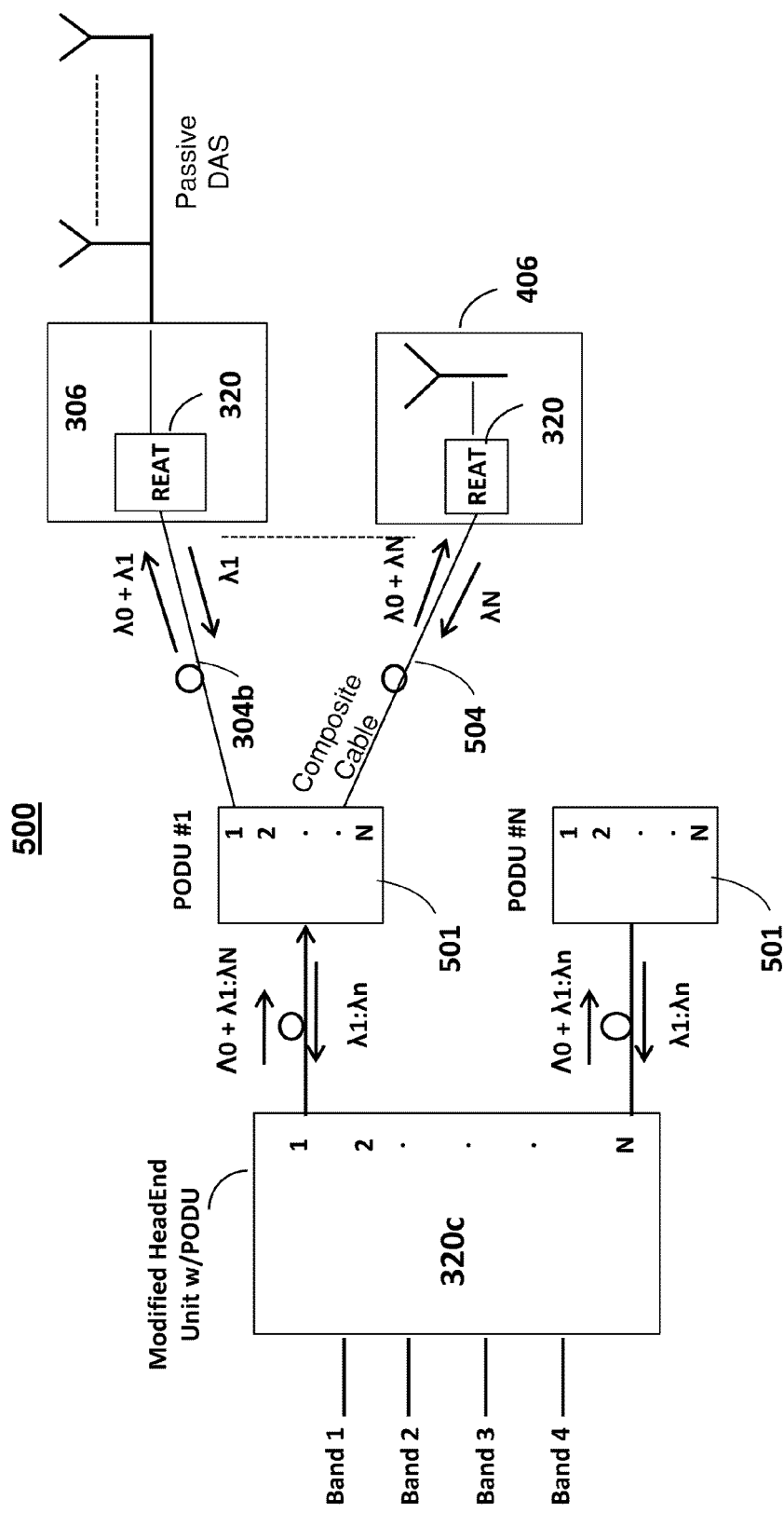
FIG. 5 shows schematically yet another embodiment of a hierarchical optical DAS disclosed herein.
Figure 5A:
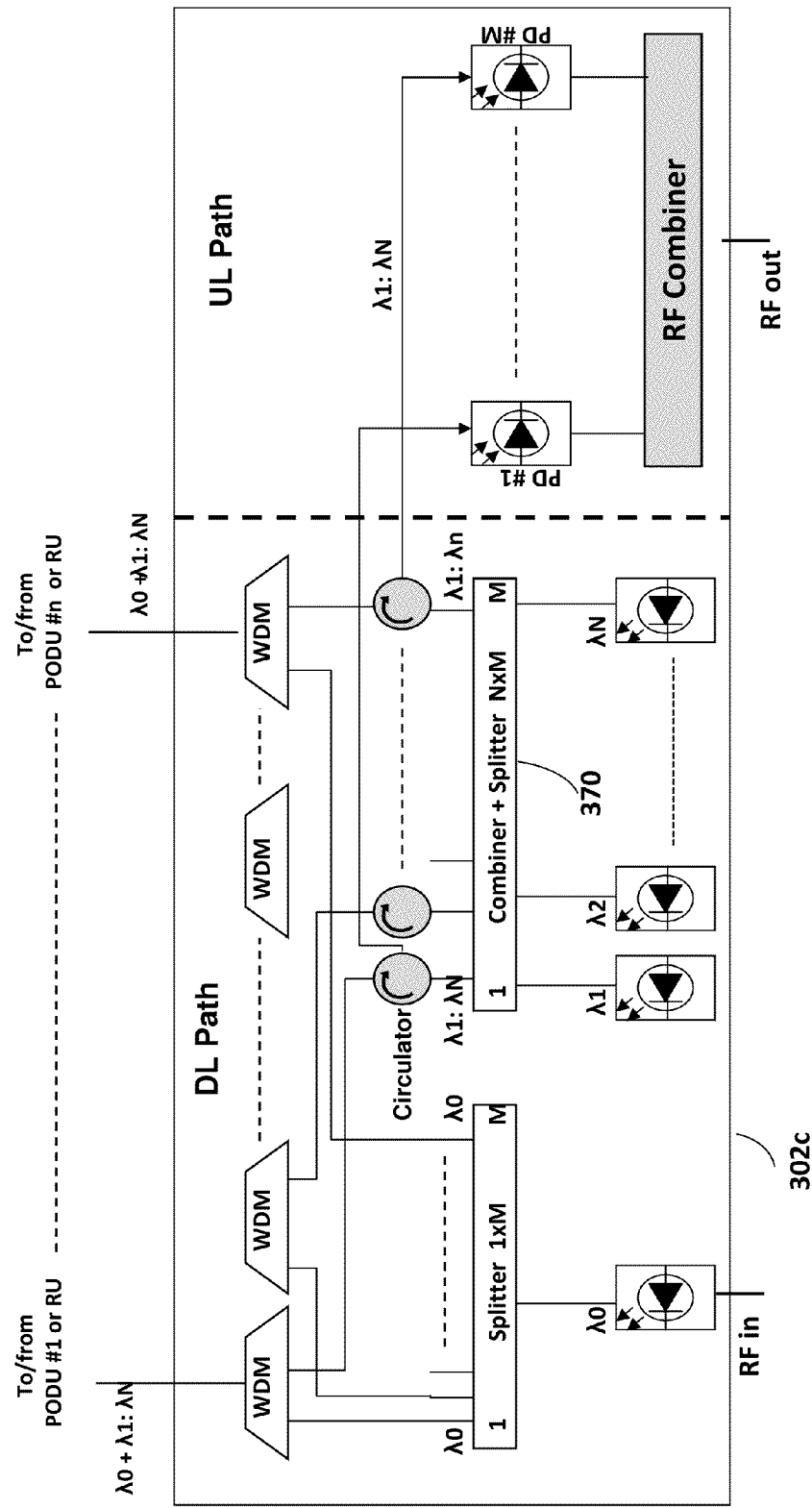
FIG. 5a shows details of yet another head-end unit, used in the optical DAS embodiment of FIG. 5.

FIG. 5 shows yet another embodiment of an optical DAS disclosed herein, marked 500. DAS 500 combines elements of DAS 300 and DAS 400 to provide a hierarchical and hybrid system. This system includes another embodiment of a HE unit marked 302c (see FIG. 5a), RUs 306 and OAUs 406. HE unit 302c is similar to HE unit 302a, except that it is adapted to transmit downlink through each optical interface all CWs with $\lambda_N$. In addition to components also found in HE unit 302a, HE unit 302c includes a N×M combiner+splitter 370 positioned between the optical transmitters and the circulators. The hierarchical and hybrid aspects are enabled by addition of N passive optical distribution units (PODUs) 501, which are described in more detail with reference to FIG. 5b. In some embodiments, a PODU is essentially similar to a MUX.DEMUX 342, taken out of the HE unit. Each PODU is connected through an optical fiber 304a to HE unit 302c, through another optical fiber 304b to a respective RU 306 and through a composite cable 504 to a respective OAU 406. As shown, each PODU may be connected to any mixture N of RUs 306 and OAUs 406.

Figure 5B:
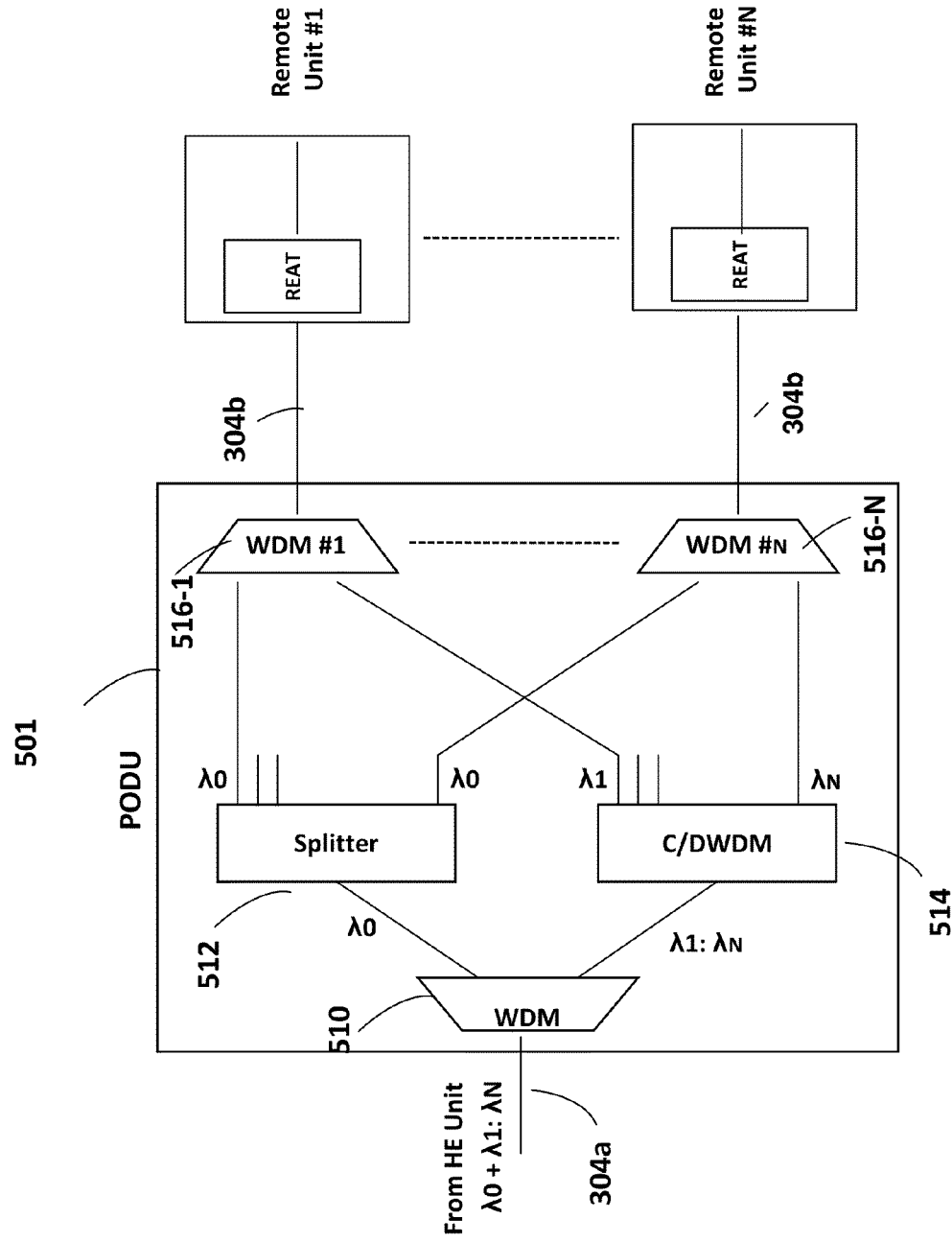
FIG. 5b shows details of a passive optical distribution unit used in the optical DAS embodiment of FIG. 5.

A PODU is completely passive (not powered). As shown in FIG. 5b, it includes a first WDM 510, a splitter 512, a C/DWDM 514 and N second WDMs 516-1 . . . 516-N, interconnected as shown. Downlink, a PODU receives from the HE unit a $\lambda_0$ optical signal and CWs with $\lambda_N$ which enter WDM 510. In WDM 510, the $\lambda_0$ signal is separated from the CWs. The $\lambda_0$ signal passes to splitter 512 which splits it into N signals matching N ports. The $\lambda_N$ CWs pass through C/WDM 514, which directs each CW to a WDM 516. Each WDM 516 also receives the $\lambda_0$ signal and combines it with one $\lambda_N$ CW. The combined $\lambda_0$ signal and $\lambda_N$ CW are directed to a respective optical interface and transmitted to a respective RU over a fiber 304. The operations are reversed uplink.

Figure 6:
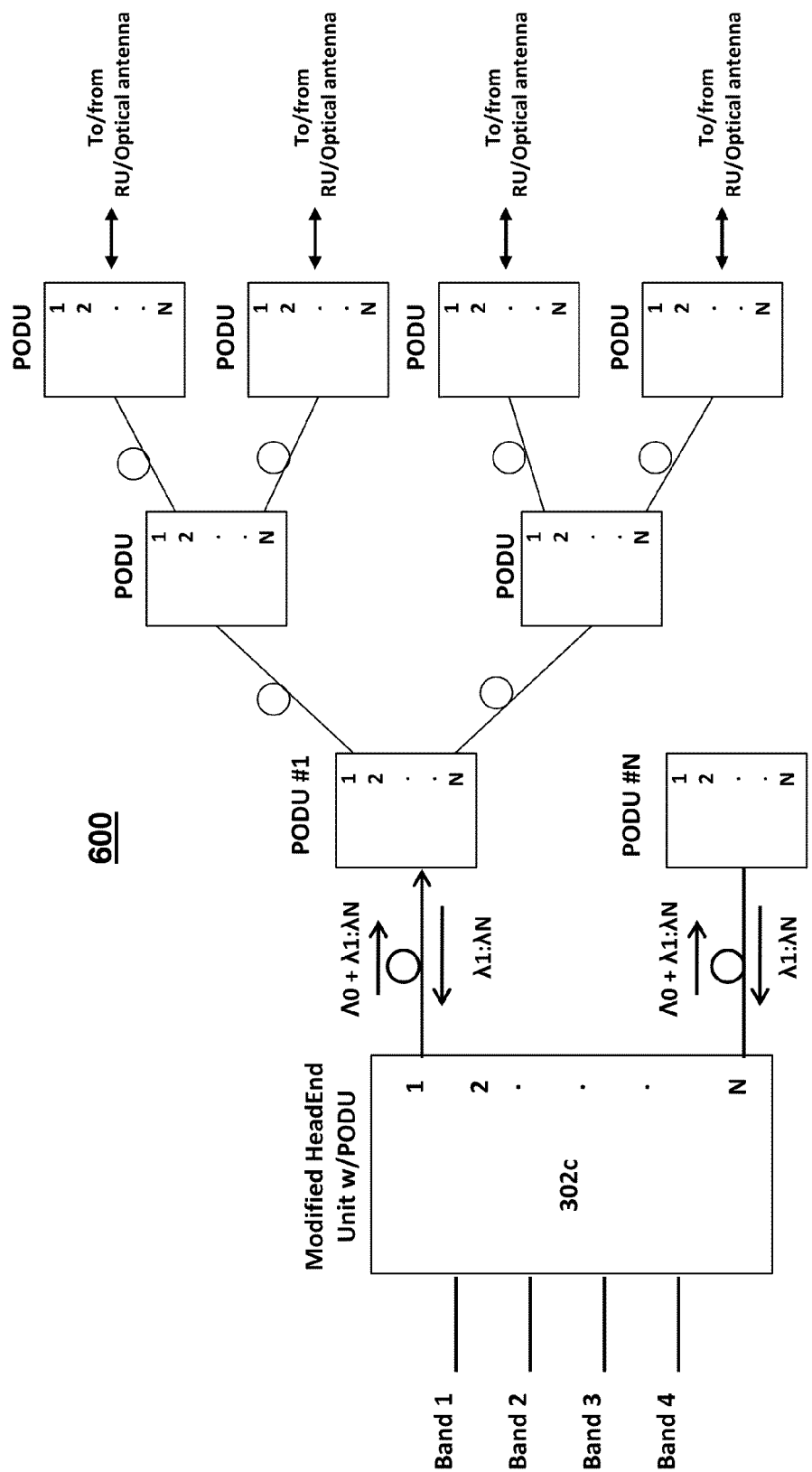
FIG. 6 shows schematically yet another embodiment of a hierarchical optical DAS disclosed herein.

FIG. 6 shows yet another embodiment of an optical DAS disclosed herein marked 600. DAS 600 comprises a hierarchy of "cascaded" PODUs. Downlink, N outputs of one PODU may be directed to N PODUs, which in turn may be connected to either RUs, OAUs, other PODUs or a combination thereof. This enables creation of various hierarchical optical DAS architectures while keeping all the advantages listed above for DAS embodiments 300 and 500.

Figure 7:
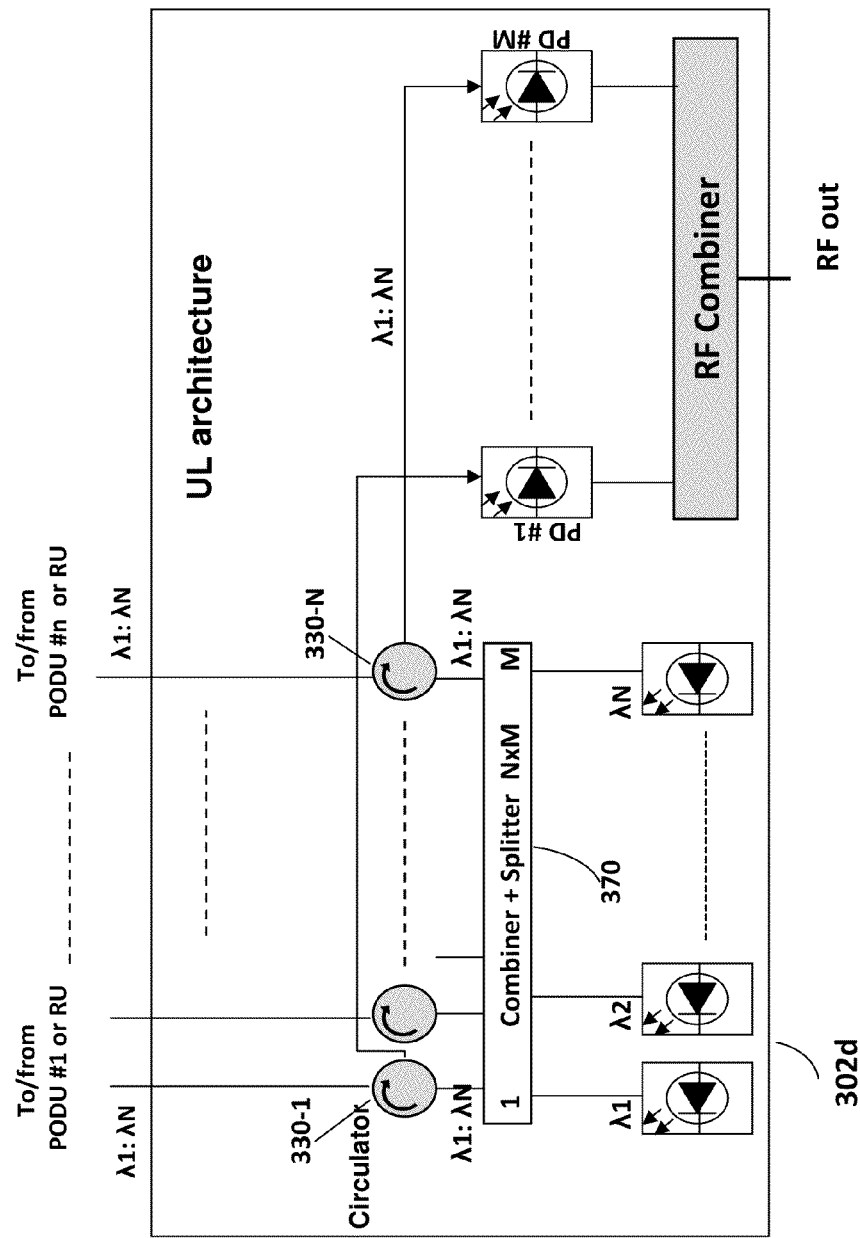
FIG. 7 shows details of an embodiment of yet another head-end unit disclosed herein.

FIG. 7 shows details of an embodiment 302d of yet another head-end unit disclosed herein. In this embodiment, the HE unit transmits downlink in a conventional way using N transmitters. When the DL traffic is transmitted over a single fiber with the UL traffic, an additional WDM unit at the RU (not shown) separates the UL and DL wavelengths. In this case, the DL traffic ($\lambda_0$ signal) does not pass through the REAT, while the UL traffic uses the REAT in each RU as described above. Circulators 330-1 . . . 330-N allow to receive modulated UL signals resulting from DL transmitted CWs which were reflected and modulated by the REATs.

Figure 8A:
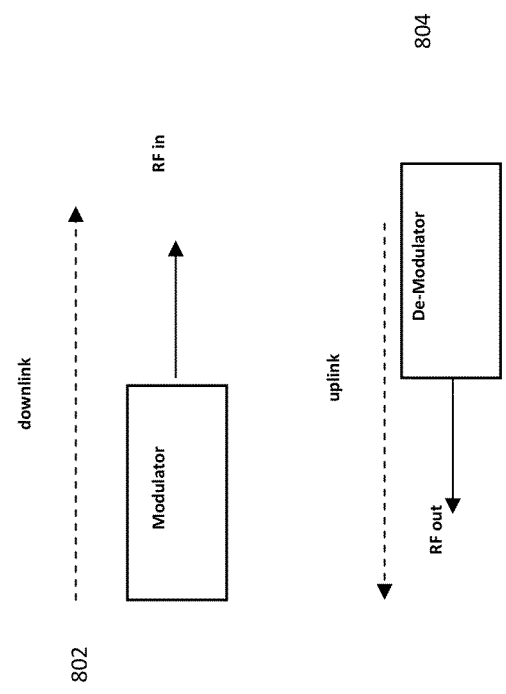
FIG. 8a shows a modulator which converts a digital signal into an analog/RF signal and a demodulator which converts an analog/RF signal into a digital signal, for enabling an optical DAS disclosed herein to be used for digital traffic.
Figure 8B:
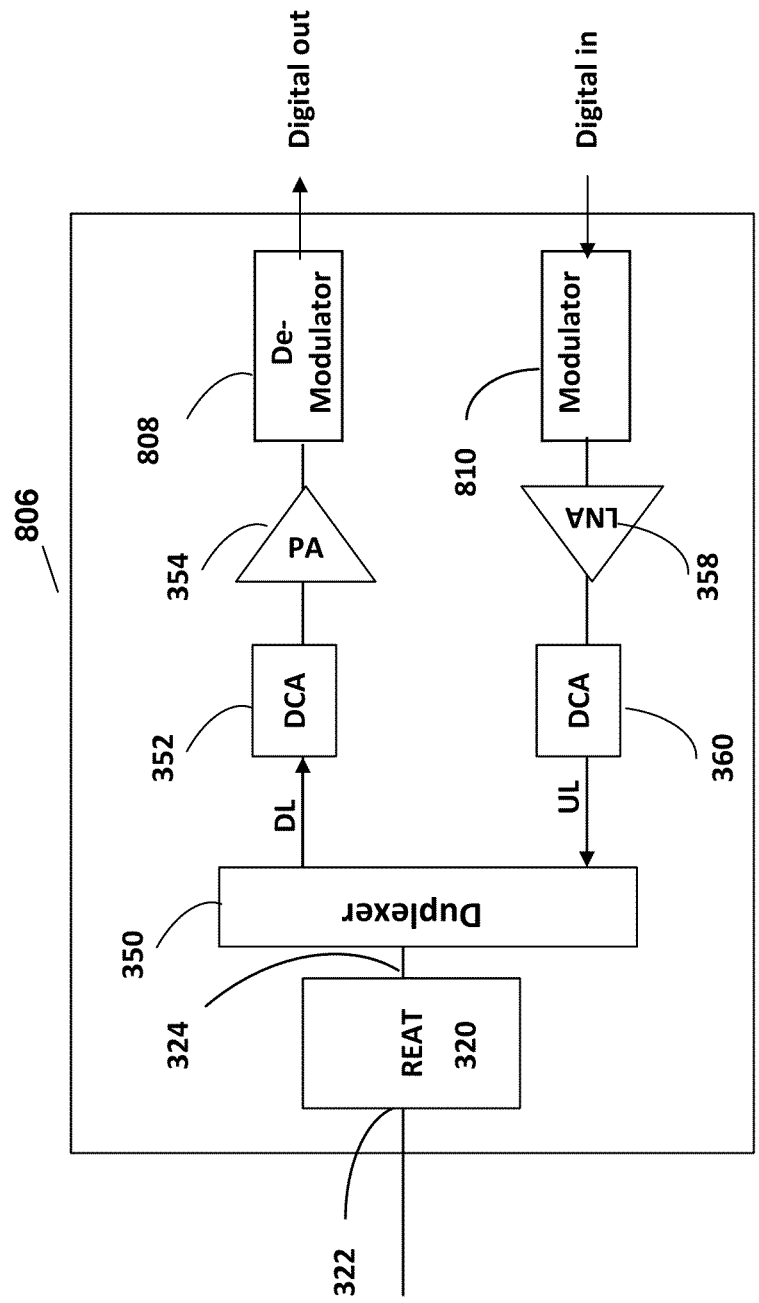
FIG. 8b shows schematically another embodiment of a remote unit disclosed herein, adapted for digital traffic.

FIG. 8a shows two components, a modulator 802 which converts a digital signal to an analog/RF signal and a demodulator 804, which converts an analog/RF signal into a digital signal. FIG. 8b shows schematically details of another embodiment of a remote unit disclosed herein marked 806, which is adapted for digital traffic. The modulation and demodulation of the digital signal to analog/RF and vice versa can be supported by any existing cellular modulating scheme such as CDMA, W-CDMA, OFDM, WAVELET transforms etc. Components 802, 804 and 806, when added to any optical DAS disclosed above, allow the optical DAS to deliver not only RF analog traffic but also digital data traffic. In the DL direction, modulator 802 is positioned before an "RF in" port. In the UL direction, demodulator 804 is positioned before an "RF out" port. RU 806 includes some of the components of a RU or OAU (marked by the same numerals), except that the second duplexer and passive DAS in RU 306a or the two port antenna in OAU 406 are replaced by a demodulator 808 in the DL path and a modulator 810 in the UL path.

In use, in the DL direction, modulator 802 converts a digital signal into a RF signal which is then further converted into a optical signal which is transmitted to RU 806. In RU 806, the $\lambda_0$ optical signal is converted back into a digital signal using demodulator 808, which outputs a "digital out" signal. In the UL direction, a "digital in" signal entering RU 806 is modulated by modulator 810 and converted into an optical signal which is transmitted to the HE unit, where demodulator 804 converts it back into a digital signal, In combination with hierachical schemes shown above, this "tree" architecture may be sued for any digital passive optical network (PON) by using the REAT reflecting ability, thereby enlarging the UL bandwith.

While this disclosure describes a limited number of embodiments of the invention, it will be appreciated that many variations, modifications and other applications of such embodiments may be made. The disclosure is to be understood as not limited by the specific embodiments described herein, but only by the scope of the appended claims.

The invention claimed is:

1. An optical distributed antenna system (DAS) comprising:
   a) a head-end (HE) unit used to transmit downlink (DL) a modulated DL $\lambda_0$ optical signal and a plurality N of continuous waves (CWs), each CW having a different wavelength $\lambda_N$; and
   b) a plurality of remote units (RU), wherein each RU includes a reflective electro-absorption transceiver (REAT) which has a single optical interface and a single RF port, the REAT used to detect and convert the $\lambda_0$ optical signal into a RF signal and to reflect and modulate one CW with wavelength $\lambda_N$ for uplink transmission to the HE unit.

2. The optical DAS of claim 1, wherein the HE unit includes one optical transmitter which provides the $\lambda_0$ optical signal and N optical transmitters which provide the CWs with wavelengths $\lambda_N$.

3. The optical DAS of claim 1, wherein the REAT includes a multi-quantum well structure.

4. The optical DAS of claim 1, wherein the HE unit is connected to each RU by a single mode optical fiber.

5. The optical DAS of claim 1, wherein at least one RU is connected to a passive DAS.

6. The optical DAS of claim 1, wherein at least one RU is configured as an optical antenna unit.

7. The optical DAS of claim 1, adapted to convert digital to RF signals and RF to digital signals and to transmit digital signals both uplink and downlink.

8. The optical DAS of claim 2, wherein the HE unit includes a 1×M splitter for splitting the $\lambda_0$ optical signal to M optical interfaces and N wavelength division multiplexers (WDM), each WDM configured to receive the $\lambda_0$ optical signal and a $\lambda_N$ CW and to output both to a respective RU.

9. The optical DAS of claim 8, wherein the HE unit further includes N optical circulators positioned between N optical transmitters which route the CWs with wavelengths $\lambda_N$ to the N WDMs.

10. The optical DAS of claim 1, wherein the HE unit includes a 1×N C/DWDM combiner for combining the N un-modulated optical signals into a single output.

11. The optical DAS of claim 1, further comprising a passive optical antenna unit (PODU) interposed between a RU and the HE unit, the PODU configured to enable a hierarchical DAS architecture.

12. The optical DAS of claim 6, further including a passive optical antenna unit (PODU) interposed between an optical antenna unit and the HE unit, the PODU configured to enable a hierarchical DAS architecture.

13. The optical DAS of claim 1, wherein the HE unit includes a single detector and a circulator of uplink signals with wavelength $\lambda_1$ to $\lambda_N$ which prevents beating.

14. An optical distributed antenna system (DAS) comprising:
   a) a head-end (HE) unit used to transmit downlink a modulated $\lambda_0$ optical signal and a plurality N of continuous waves (CWs) with respectively different wavelengths $\lambda_N$, the HE unit including an arrangement of a single detector and a circulator for a bunch of uplink signals with wavelength $\lambda_1$ to $\lambda_N$, wherein the arrangement prevents beating per bunch; and
   b) a plurality of remote units (RU), each RU including a reflective electro-absorption transceiver (REAT) used to detect and convert the $\lambda_0$ optical signal into a RF signal and to reflect and modulate one CW with wavelength $\lambda_N$ for uplink transmission to the HE unit.

15. The optical DAS of claim 14, further comprising:
   c) a passive optical antenna unit (PODU) interposed between at least one RU and the HE unit, the PODU configured to enable a hierarchical DAS architecture.

16. The optical DAS of claim 14, wherein the REAT includes a single optical interface and a single RF port.

17. The optical DAS of claim 14, adapted to convert digital to RF signals and RF to digital signals and to transmit digital signals both uplink and downlink.

18. The optical DAS of claim 14, wherein the REAT includes a multi-quantum well structure.

19. A method for communications in an optical distributed antenna system (DAS) comprising the steps of:
   a) at a head-end (HE) unit, transmitting downlink to a remote unit (RU) a modulated optical signal with wavelength $\lambda_0$ and a continuous wave (CW) with wavelength $\lambda_N$;
   b) at the RU, using a reflective electro-absorption transceiver (REAT) with a single optical interface and a single RF port to convert the modulated optical signal with wavelength $\lambda_0$ into a downlink RF signal and to reflect and modulate the CW with wavelength $\lambda_N$ to obtain a reflected modulated optical signal with wavelength $\lambda_N$; and
   c) transmitting the reflected optical signal with wavelength $\lambda_N$ uplink to the HE unit.

20. The method of claim 18, further comprising the step of:
   d) performing digital to RF conversion in both uplink and downlink, thereby adapting the optical DAS for digital data transmission.

* * * * *